(12) United States Patent
Uehara et al.

(10) Patent No.: US 8,885,111 B2
(45) Date of Patent: Nov. 11, 2014

(54) OPTICAL NODE DEVICE

(71) Applicant: Santec Corporation, Aichi (JP)

(72) Inventors: Noboru Uehara, Aichi (JP); Yuji Hotta, Aichi (JP)

(73) Assignee: Santec Corporation, Aichi (JP)

( * ) Notice: Subject to any disclaimer, the term of this patent is extended or adjusted under 35 U.S.C. 154(b) by 0 days.

(21) Appl. No.: 13/938,442

(22) Filed: Jul. 10, 2013

(65) Prior Publication Data

US 2014/0028936 A1  Jan. 30, 2014

(30) Foreign Application Priority Data

Jul. 25, 2012  (JP) .................................. 2012-164555

(51) Int. Cl.
| | | |
|---|---|---|
| *G02F 1/13* | (2006.01) | |
| *G02F 1/31* | (2006.01) | |
| *G02F 1/01* | (2006.01) | |

(52) U.S. Cl.
CPC ................ *G02F 1/1326* (2013.01); *G02F 1/31* (2013.01); *G02F 1/13* (2013.01); *G02F 2203/585* (2013.01); *G02F 1/01* (2013.01)
USPC .............................................. 349/1; 345/103

(58) Field of Classification Search
CPC .............................. G02F 1/31; G02F 2203/585
USPC ................................................ 349/1; 345/103
See application file for complete search history.

(56) References Cited

U.S. PATENT DOCUMENTS

| | | |
|---|---|---|
| 5,903,248 A | 5/1999 | Irwin |
| 7,014,326 B2 | 3/2006 | Danagher et al. |
| 7,725,027 B2 | 5/2010 | Keyworth et al. |

(Continued)

FOREIGN PATENT DOCUMENTS

| | | | |
|---|---|---|---|
| JP | 2009-223289 | * | 10/2009 |
| JP | 2012-108346 | * | 6/2012 |
| JP | 2012-108346 A | | 6/2012 |

OTHER PUBLICATIONS

Sakurai, Y.; Kawasugi, M.; Hotta, Y.; Khan, M.S.; Oguri, H.; Takeuchi, K.; Michihata, S.; Uehara, N., "LCOS-based 4×4 wavelength cross-connect switch for flexible channel management in ROADMs," Optical Fiber Communication Conference and Exposition (OFC/NFOEC), 2011 and the National Fiber Optic Engineers Conference, v. 1, No. 3, pp. 6-10 Mar. 2011.*

(Continued)

*Primary Examiner* — Bumsuk Won
*Assistant Examiner* — Ryan Crockett
(74) *Attorney, Agent, or Firm* — Osha Liang LLP

(57) ABSTRACT

An optical node device includes a light receiving/emitting portion having an input port into which a signal beam is incident and an output port that emits a signal beam of a selected wavelength, a chromatic dispersion device that scatters spatially the signal beam depending on the wavelength of the signal beam, an optical coupler that focuses, onto a two-dimensional plane, beams dispersed by the chromatic dispersion device, a spatial light modulating element arranged so as to receive incident light deployed on an xy plane made up of an x-axis direction deployed according to wavelength and a y-axis direction orthogonal to the x-axis direction, and having numerous pixels arranged in a lattice on the xy plane, and a spatial light modulating element driving portion that drives electrodes of the individual pixels arranged in the xy axial directions in the spatial light modulating element.

20 Claims, 9 Drawing Sheets

(56) References Cited

U.S. PATENT DOCUMENTS

| | | |
|---|---|---|
| 7,787,720 B2 | 8/2010 | Frisken et al. |
| 7,822,303 B2 | 10/2010 | Cohen et al. |
| 2006/0119927 A1* | 6/2006 | Matsuki et al. ............... 359/315 |
| 2011/0032231 A1* | 2/2011 | Maruyama et al. ........... 345/102 |

OTHER PUBLICATIONS

English abstract of Japanese Publication No. 2012-108346 published on Jun. 7, 2012, Espacenet database, 1 page.

* cited by examiner

Applied Voltage

Pixel Voltage

Pixel Voltage

OPTICAL NODE DEVICE

FIELD OF TECHNOLOGY

The present invention relates to an optical node device that includes, for example, a wavelength selective optical switching device, a wavelength blocker device, and the like, used in a liquid crystal spatial light modulating element used in the field of optical communications.

BACKGROUND ART

Wavelength multiplexed optical indication technology is currently used in high-speed high-capacity optical networks to support high-level data communication firms. Advances are being made in deployment of ROADM (Reconfigurable Optical Add Drop Multiplexer) devices that have reconfigurable add and drop functions. The ROADM device is structured from, primarily, a wavelength selective switch (sometimes termed a "WSS"), a wavelength blocker (sometimes termed a "WB"), and the like, to be an optical node device that includes optical filtering functions, optical attenuation functions, and optical switching functions. In order to achieve the ROADM device, the wavelength selective switch must switch light of an arbitrary wavelength in an arbitrary direction. In the wavelength selective switch, an optical beam deflecting element that selects a wavelength and deflects the optical beam to a desired output port is used. In the wavelength blocker device, an optical beam deflecting element is used in order to select a wavelength and either output or not output the optical beam to a desired output port. Patent Citations 1 and 2 propose the use of mechanical dislocation of a MEMS (Micro-Electro-Mechanical System) mirror array as the optical beam deflecting element. Spatial light modulators (sometimes termed "SLMs") are also known as optical beam deflecting elements. Of these, there are liquid crystal spatial light modulating elements known as LCOS (Liquid Crystal On Silicon) elements that use CMOS technology. Patent Citations 3, 4, and 5 propose the use of LCOS (Liquid Crystal On Silicon) elements.

A control method wherein a phase diffraction grating (Optical Phased Array, sometimes termed "OPA") is formed through a phase modulating function and the diffraction phenomenon is used, and a method wherein the amplitude is controlled through rotation of polarization are well-known As methods for controlling liquid crystal spatial light modulating elements.

PATENT CITATIONS

[Patent Citation 1] U.S. Pat. No. 7,725,027
[Patent Citation 2] U.S. Pat. No. 7,787,720
[Patent Citation 3] U.S. Pat. No. 7,014,326
[Patent Citation 4] U.S. Pat. No. 7,822,303
[Patent Citation 5] Japanese Unexamined Patent Application Publication No. 2012-108346

In an optical node device that uses a liquid crystal spatial light modulating element, such as an LCOS element, the liquid crystal spatial light modulating element is controlled through diffraction control through phase modulation or through polarization control through amplitude modulation. However, the LCOS element uses driving elements conventionally developed for displaying video signals, where the switching speeds of the individual pixels are driven at the 120 Hz alternating current frequency (frame rate) of a video signal. Because of this, in an optical load device that uses a liquid crystal spatial light modulating element, a flashing phenomenon known as flickering, which varies depending on the period, occurs due to the output signal being powered by a video signal. Moreover, the magnitude of the power variation increases or decreases depending on the amount of optical attenuation.

Furthermore, the degree of flickering in the liquid crystal spatial light modulating element depends on the temperature of the use environment. When compared to the room temperature, the temperature of use of optical communication equipment is high, and flickering increases at, for example, 65° C. Given this, because the LCOS element is used in an optical communication application, temperatures are maintained at about room temperature using thermal electric cooling elements (TEC) such as Peltier elements. However, when thermal electric cooling elements are used, this unavoidably increases the size of the equipment and power consumption for the cooling.

SUMMARY OF THE INVENTION

In one aspect, the present invention provides an optical node device that uses a spatial light modulating element that is able to reduce flicker and achieves a light node device that is small and consumes little power, because it does not use thermal electric cooling elements.

In one aspect, an optical node device comprises a light receiving/emitting portion having an input port into which a signal beam is incident and an output port that emits a signal beam of a selected wavelength; a chromatic dispersion device that scatters spatially the signal beam depending on the wavelength of the signal beam; an optical coupler that focuses, onto a two-dimensional plane, beams dispersed by the chromatic dispersion device; a spatial light modulating element arranged so as to receive incident light deployed on an xy plane made up of an x-axis direction deployed according to wavelength and a y-axis direction orthogonal to the x-axis direction, and having numerous pixels arranged in a lattice on the xy plane; and a spatial light modulating element driving portion that drives electrodes of the individual pixels arranged in the xy axial directions in the spatial light modulating element so as to either reflect or transmit each of the beams having an individual wavelength in a respective direction.

In one or more embodiments the spatial light modulating element may comprise a plurality of pixels provided at intersecting portions at which a plurality of sets of data lines and a plurality of gate lines respectively intersect, wherein each set of data lines has two data lines; a plurality of switches provided respectively relative to the plurality of sets of data lines, wherein the switches supply a positive polarity signal to one of the two data lines in a set and a negative polarity signal to the other data line, sequentially, by set units, to the plurality of sets of data lines; a horizontal direction driving circuit that drives the plurality of switches, by set units, during a horizontal scanning period; and a vertical direction driving circuit that performs vertical direction driving that selects a plurality of the gate lines with each horizontal scanning period. The plurality of pixels may comprise a liquid crystal element in which a liquid crystal layer is interposed between a mutually facing pixel electrode and common electrode; a first sampling circuit that samples a positive polarity pixel signal and holds it for a specific time period; a second sampling circuit that samples a negative polarity pixel signal and holds it for the specific time period; and a switching circuit that switches alternatingly a positive polarity signal voltage and a negative polarity signal voltage, stored respectively by the first and second sampling circuits, to the pixel electrode by switching, with a specific period that is shorter than a vertical scanning period. The plurality of pixels may further comprise a first buffer amp for performing impedance conversion of a positive polarity signal voltage that is stored by the first sampling circuit; and a second buffer amp for performing impedance conversion of a negative polarity signal voltage that is stored by the second sampling circuit; wherein: the switching circuit may switch alternatingly, with the specific period, the positive polarity signal voltage that is outputted from the first buffer amp and the negative polarity signal voltage that is outputted from the second buffer amp.

In one or more embodiments, the first and second buffer amps each comprises an impedance conversion transistor; and a constant current load transistor that can control channel current characteristics with a bias voltage applied to a gate. The constant current load transistor becomes discontinuously active in synchronization with a timing of switching at the specific period of the switch.

In another aspect, the optical node device according to one or more embodiments may comprise a light receiving/emitting portion having an input port into which a signal beam is incident and an output port that emits a signal beam of a selected wavelength; a chromatic dispersion device that scatters spatially the signal beam depending on the wavelength of the signal beam; an optical coupler that focuses, onto a two-dimensional plane, beams dispersed by the chromatic dispersion device; a spatial light modulating element arranged so as to receive incident light deployed on an xy plane made up of an x-axis direction deployed according to wavelength and a y-axis direction orthogonal to the x-axis direction, and having numerous pixels arranged in a lattice on the xy plane; and a spatial light modulating element driving portion that drives electrodes of the individual pixels arranged in the xy axial directions in the spatial light modulating element so as to either reflect or transmit each of the beams having an individual wavelength in a respective direction, wherein the spatial light modulating element driving portion divides the surface of use of the spatial light modulating element into at least two parts, wherein a surface area to be used is no more than one half of the total surface area.

Here the spatial light modulating element may be an LCOS element having pixels arranged two-dimensionally.

One or more embodiments of the present invention enable a reduction in the flicker of the spatial light modulating element regardless of the amount of optical attenuation. Consequently, this enables a stabilization of the level of the beam that is emitted from the spatial light modulating element. Moreover, it does not require cooling elements, thereby making it possible to achieve an optical node device that is small and that consumes little electric power.

BRIEF DESCRIPTIONS OF THE DRAWINGS

Figure 5A:
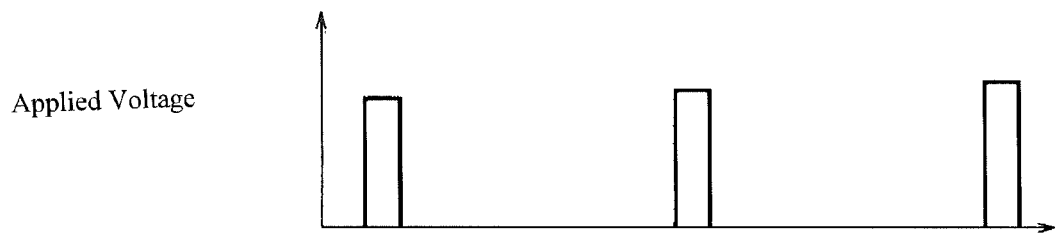
Figure 5B:
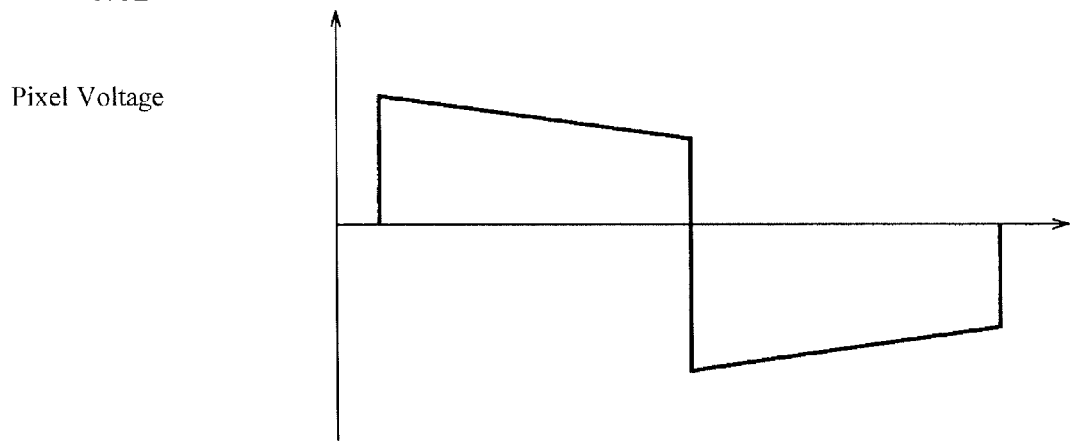
Figure 5C:
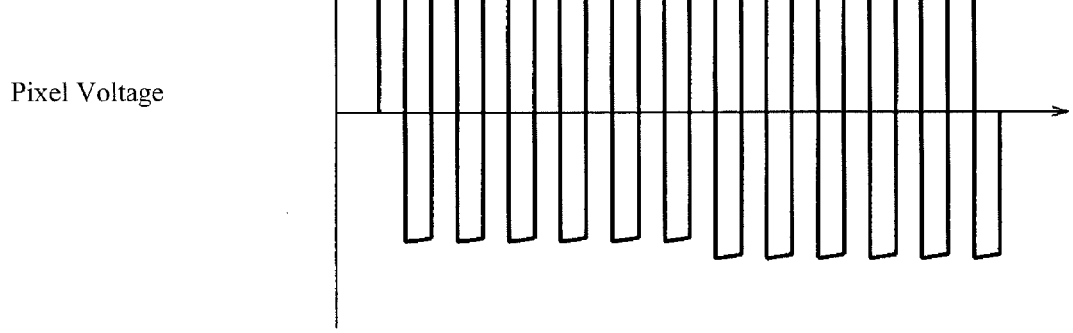

FIGS. 5A-C show a waveform diagram illustrating the applied voltage and the pixel voltage when driving a conventional LCOS element and the LCOS element according to the present embodiment.

Figure 6A:
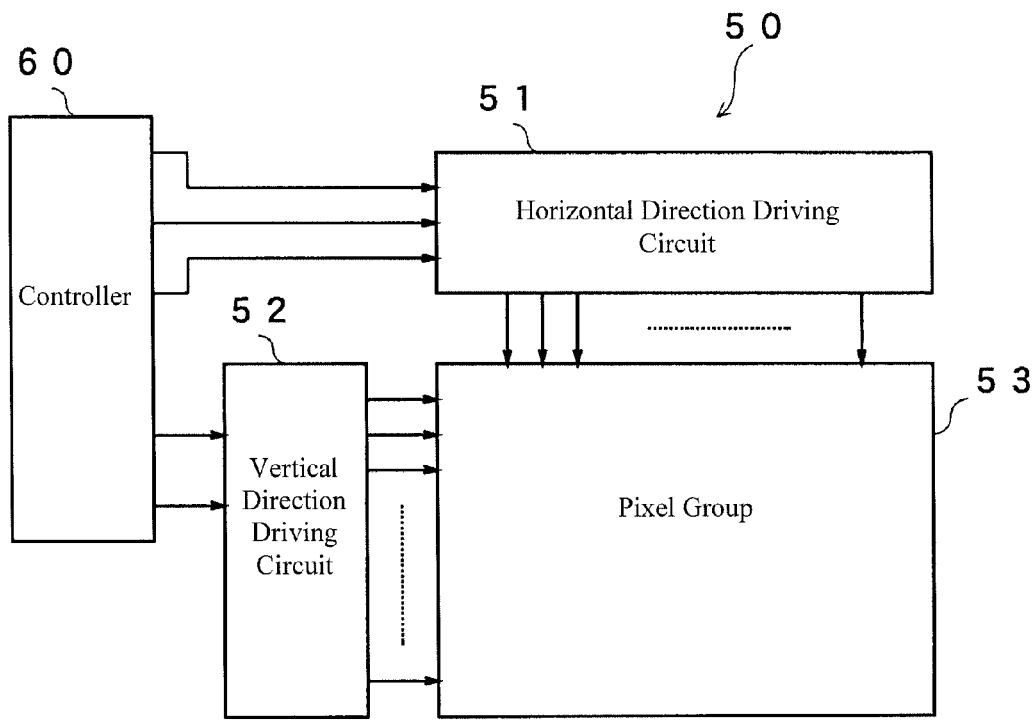

FIG. 6A is a circuit diagram illustrating the structure of an LCOS element of a wavelength selective switching device according to a second embodiment according to the present invention.

Figure 6B:
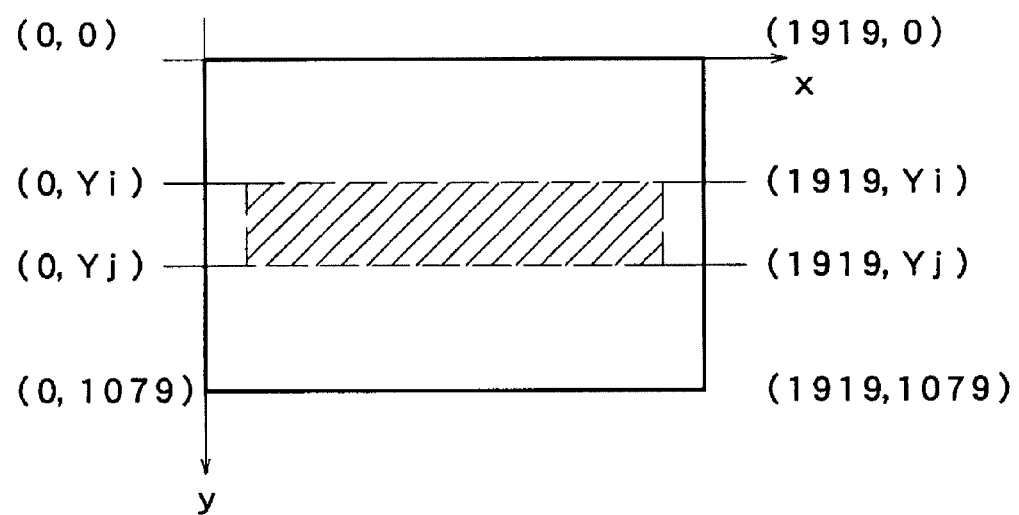

FIG. 6B is a diagram illustrating one example of an LCOS element display screen according to this embodiment.

Figure 7:
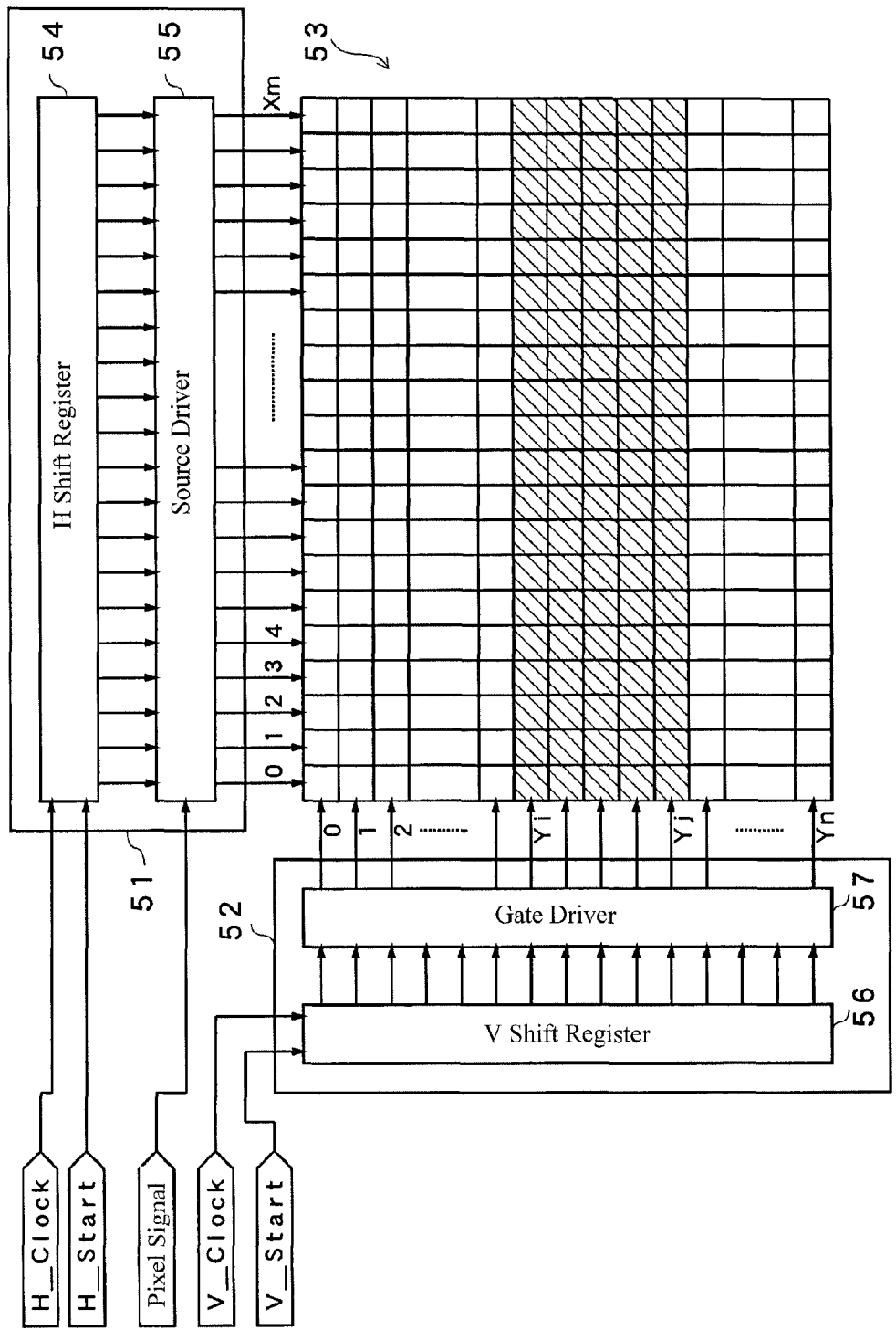

FIG. 7 is a detailed block diagram of the LCOS element according to the present embodiment.

Figure 8:
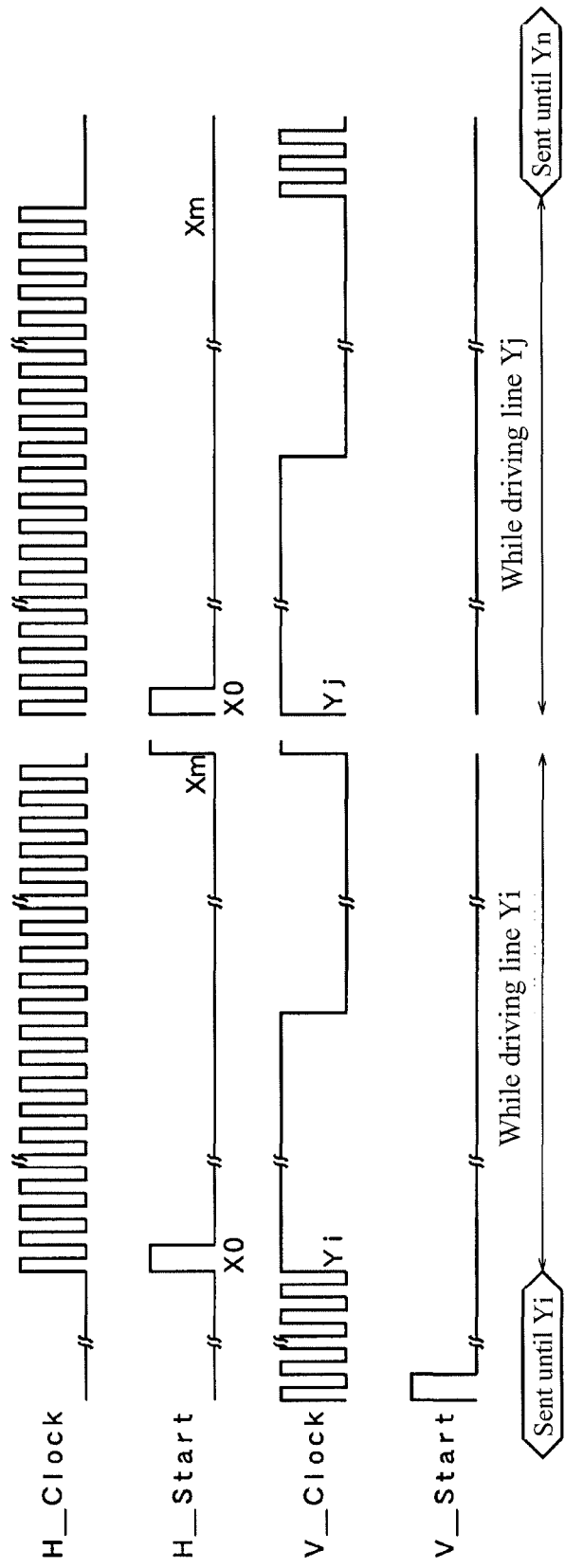
Figure 9A:
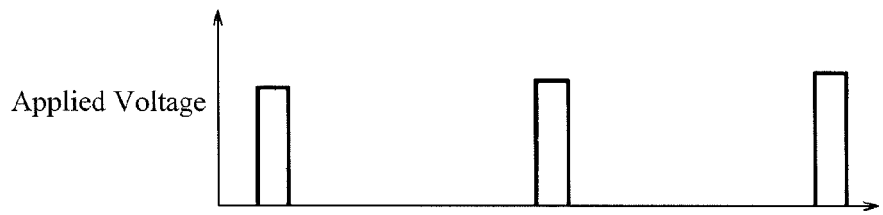
Figure 9B:
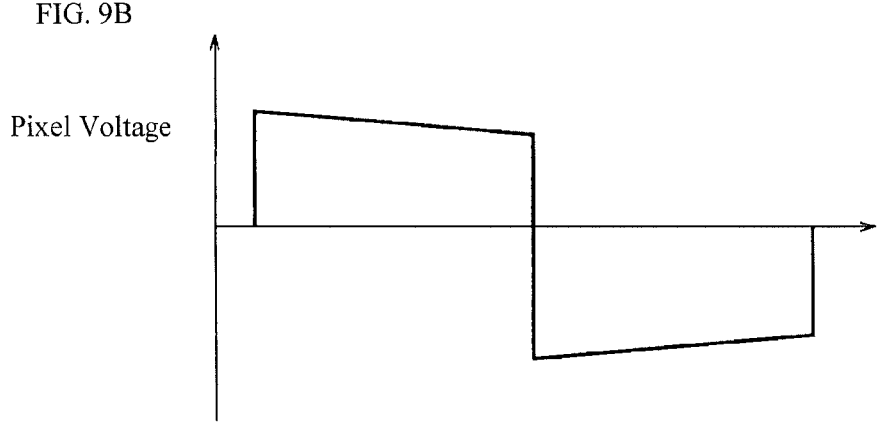
Figure 9C:
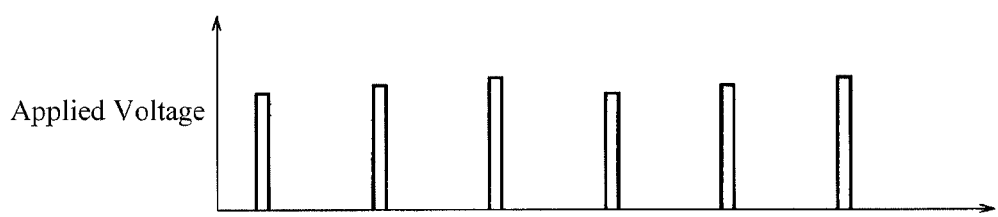
Figure 9D:
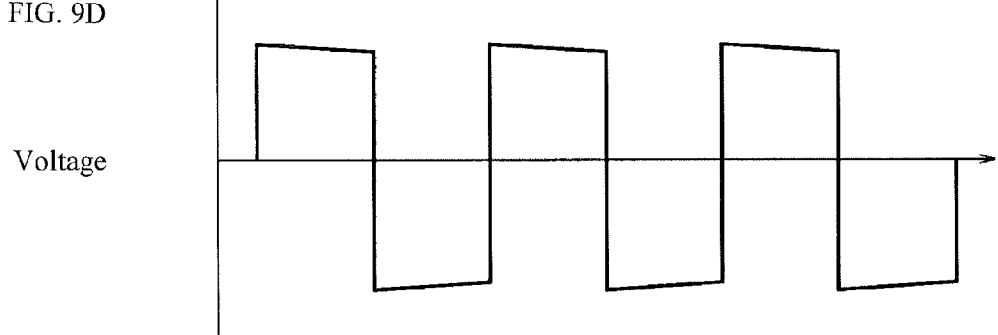

FIG. 8 is a timing chart showing the waveform when driving the LCOS element according to the present embodiment.

FIGS. 9A-D show a waveform diagram illustrating the applied voltage and the pixel voltage when driving a conventional LCOS element and the LCOS element according to the present embodiment.

DETAILED DESCRIPTION

First Embodiment

Figure 1:
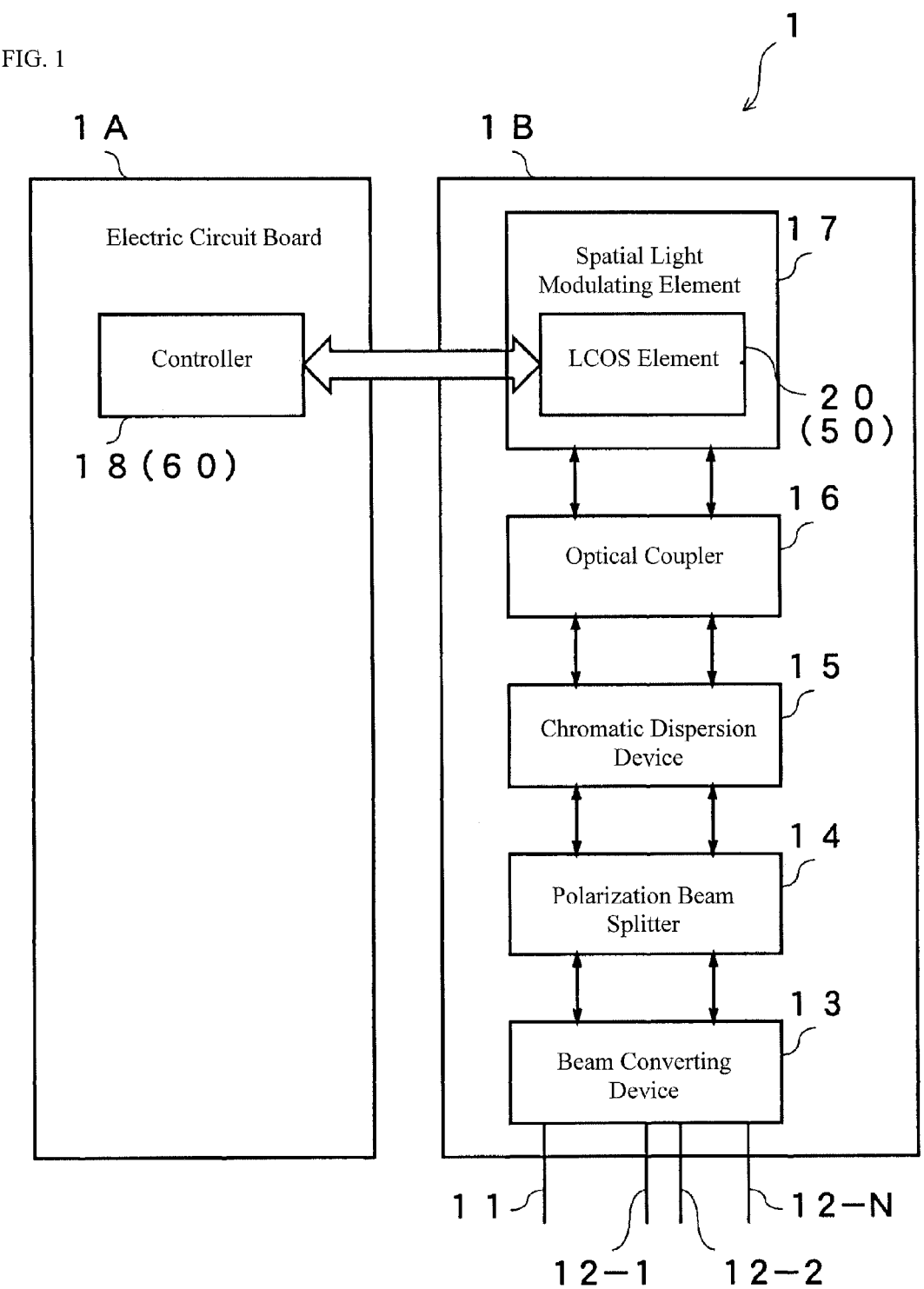
FIG. 1 is a block diagram illustrating the structure of a wavelength selective optical switching device according to a first embodiment according to the present invention.

FIG. 1 illustrates a structural diagram of a wavelength selective switching device as a typical example of an optical node device. LCOS voltage driving can be performed similarly in the case of a wavelength blocking device as well. The wavelength optical selective switching device 1 is structured from an electric circuit board 1A and an optical module 1B. The optical module 1B of the wavelength selective optical switching device 1 has one input port 11 and a plurality of output ports 12-1 through 12-N. Here the optical signal that is inputted into the input port 11 is a wavelength-division multiplexed optical signal (WDM signal) beam wherein many wavelengths are multiplexed. This WDM signal beam is inputted from an input port 11, which is an optical fiber, or the like, into a beam converting device 13 that is structured from a collimation lens. A polarization beam splitter 14 is provided on the output side of the beam converting device 13. The polarization beam splitter 14 has a polarized light beam splitter for separating the WDM beam of the input port into light beams of an s polarization component and a p polarization component, and a wave plate for converting the direction of polarization of one of the light beams into the direction of polarization of the other, to produce two parallel WDM beams. The two light beams are applied to a chromatic dispersion device 15. The chromatic dispersion device disperses in different directions depending on the wavelength. This can be achieved through, for example, a diffraction grating. The output from the chromatic dispersion device 15 is guided to the spatial light modulating element 17 through an optical coupler 16 such as a lens. The spatial light modulating element 17 is an element that receives the light that has been dispersed at the various wavelengths and changes the direction thereof and reflects it so as to be inputted into an optical coupler 16 for each individual wavelength. A controller 18 of the electric circuit board 1A is connected to the spatial light modulating element 17. Given this, the reflected beams from the spatial light modulating element 17 are combined through application to the chromatic dispersion device 15 through the optical coupler 16. The output from the chromatic dispersion device 15 is returned to the polarization beam splitter 14, and the direction of polarization of one of the combined reflected beams is rotated by the polarization beam splitter 14, to be combined. The output of the polarization beam splitter 14 is outputted from the output ports 12-1 through 12-N through the beam converting device 13. Note that while the input port 11 and the output ports 12-1 through 12-N were used, the device may also be used with the input and output reversed. The input port and output ports are structured from portions that both can receive and emit light.

In the present form of embodiment, the spatial light modulating element 17 is achieved through an LCOS element 20. In the first embodiment, the beam that is applied to the LCOS element 20 is a beam wherein the WDM beam has been deployed into an XY plane depending on the wavelength band. Here the LCOS element 20 is an element wherein 1920 elements are arranged in the direction of chromatic dispersion (the x direction) and 1080 pixels are arranged in the direction perpendicular thereto (the y direction), arranged in a matrix. In this wavelength selective switching device, the direction to which each wavelength is reflected is controlled to enable selection of the light of an arbitrary wavelength. The controller 18 determines the direction of reflection of the beams in the xy plane in accordance with the selected wavelength. The controller 18 has a spatial light modulating element driving portion that is structured so as to control the characteristics of the pixel in a specific location in the x-axial and y-axial directions so as to drive the electrodes of the individual pixels that are disposed in the xy directions of the LCOS element 20 within the spatial light modulating element 17.

In the present embodiment, the flicker is reduced through switching each pixel within the LCOS element 20 at a frequency that is higher than the video frequency, within the period of the video signal. A liquid crystal spatial light modulating element of this type that can be used in a liquid crystal projector is disclosed in Japanese Examined Patent Application Publication 2009-223289.

Figure 2:
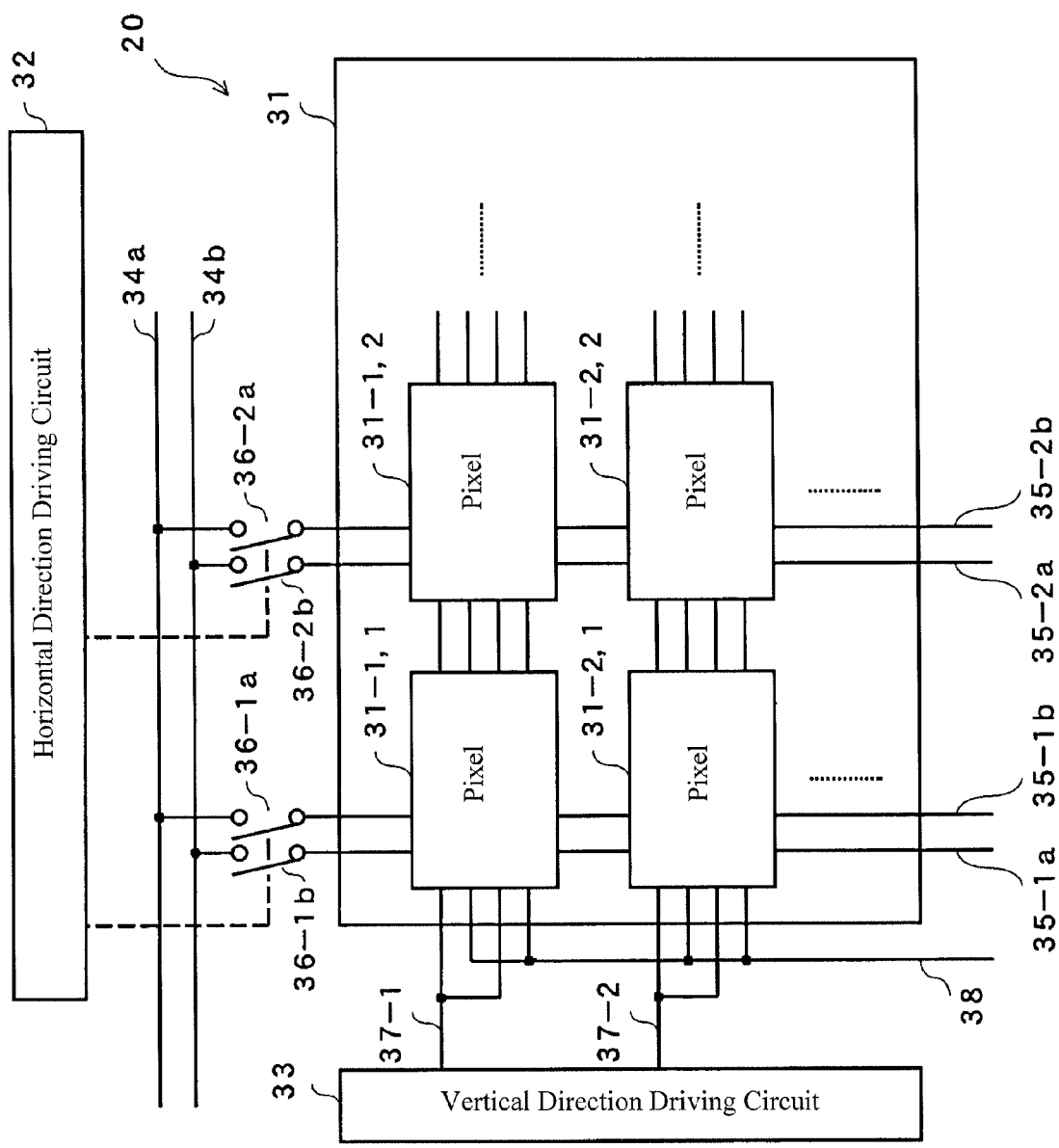
FIG. 2 is a block diagram illustrating a LCOS element that is the spatial light modulator used in the embodiment.

FIG. 2 shows an example of an LCOS element 20 and the driving circuit thereof in the present embodiment. The LCOS element is structured from a pixel portion 31, a horizontal direction driving circuit 32, a vertical direction driving circuit 33, and the like. The pixel portion 31 is structured in an array of pixels 31-1,1 through 31-1920,1080, which is 1920 pixels in the x-axial direction and 1080 pixels in the y-axial direction. In the LCOS element 20, two systems each of the horizontal signal lines 34a and 34b, data lines 35-1a, 35-1b, . . . , and switches 36-1a, 36-1b, . . . , are provided. The horizontal signal line 34a supplies, to the switches 36-1a, 36-2a . . . , the serial pixel signals for the positive side in relation to the common electrode voltage, where the horizontal signal line 34b provides, to the switches 36-1b, 36-2b, . . . , the serial pixel signals for the negative side. The gate lines 37-1, 37-2, . . . , from the vertical direction driving circuit 33 are connected to the pixel portion 31. Moreover, the common electrode lines 38 connect between the individual pixels and the controller 18. Note that the suffix numbers after the hyphens in the codes in the figure indicate different positions for identical types of structural elements. Moreover, a lowercase alphabetic letter "a" following the suffix number indicates the first of the two systems, and "b" indicates the second system. Note that FIG. 2 illustrates a portion of all of the structural elements. This can also be applied to resolution standards other than the HD standard, such as 640×480 pixels (the VGA standard), 1400×1050 pixels (the SXGA+ standard), and the like.

Moreover, the controller 18 in FIG. 1 provides, to the horizontal direction driving circuit 32 and the vertical direction driving circuit 33, various types of clock signals that are generated in order to synchronize the input pixel signals of the two systems that are applied to the horizontal signal lines 34a and 34b. Given this, pixel selection is performed according to the respective horizontal and vertical scans by driving the data lines 35-1a, 35-1b, . . . and the gate lines 37-1, 37-2, . . . , synchronized with the input pixel signals.

Figure 3:
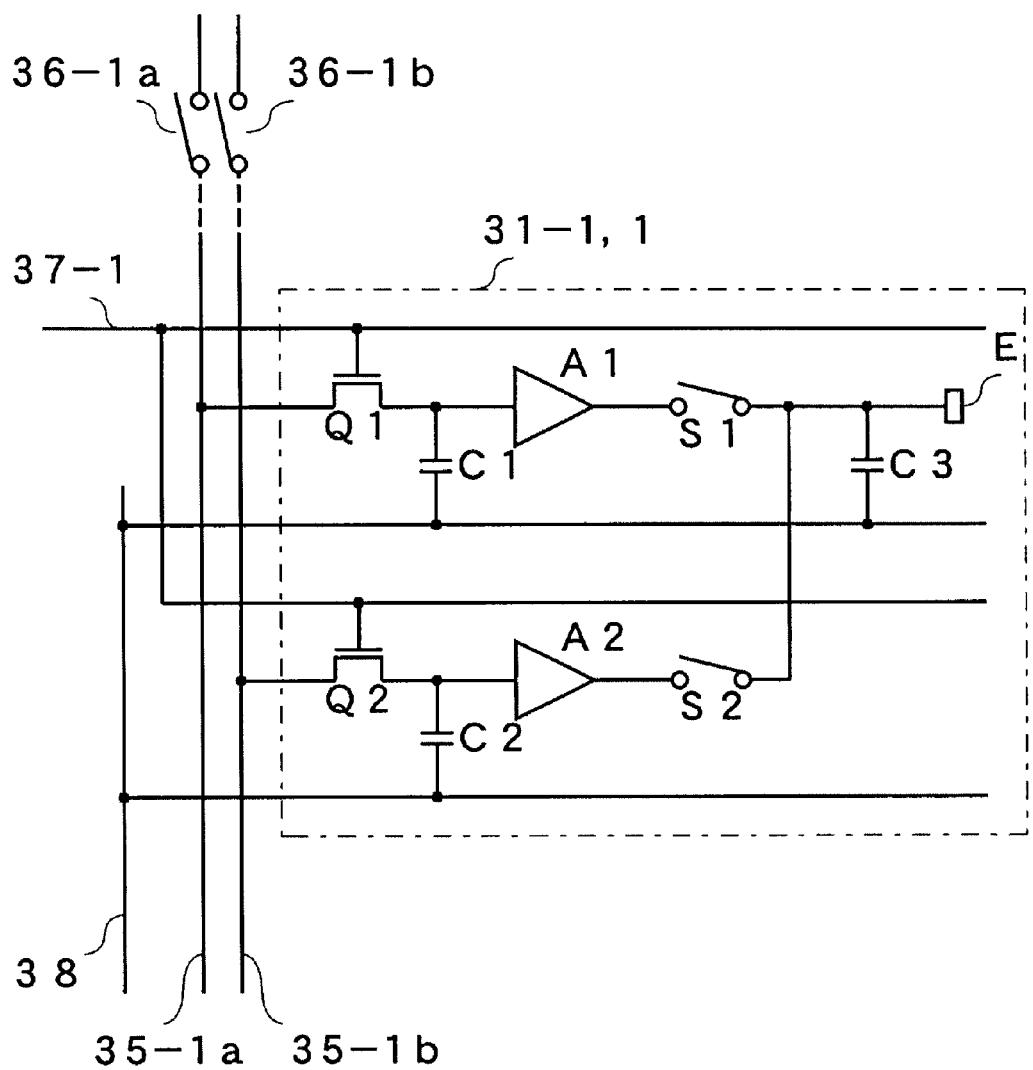
FIG. 3 is a circuit diagram of one pixel of an LCOS element according to the embodiment.

There is the internal circuitry within a single pixel 31-1,1 in FIG. 3. In FIG. 3, the data line 35-1a is connected to the drain of a pixel select transistor Q1, and the data line 35-1b is connected to the drain of a pixel select transistor Q2. The gates of these transistors Q1 and Q2 are connected in common to a gate line 37-1, and, as illustrated, are respectively connected to storage capacitances C1 and C2 in order to store the voltages between the sources and the common electrode line 38. The transistor Q1 and the storage capacitance C1 structure a first sampling circuit, and the transistor Q2 and the storage capacitance C2 structure a second sampling circuit. Buffer amps A1 and A2 are connected to the terminal portions of the storage capacitances C1 and C2, and are connected/disconnected alternatingly, through switches S1 and S2 to the pixel electrode E of the pixel. The capacitor C is a storage capacitor. The switches S1 and S2 structure a switching circuit that applies a positive signal voltage alternatingly to the pixel electrode. The display portion of a single pixel is structured with a liquid crystal layer interposed between the pixel electrode E and a common electrode, not shown.

Figure 4:
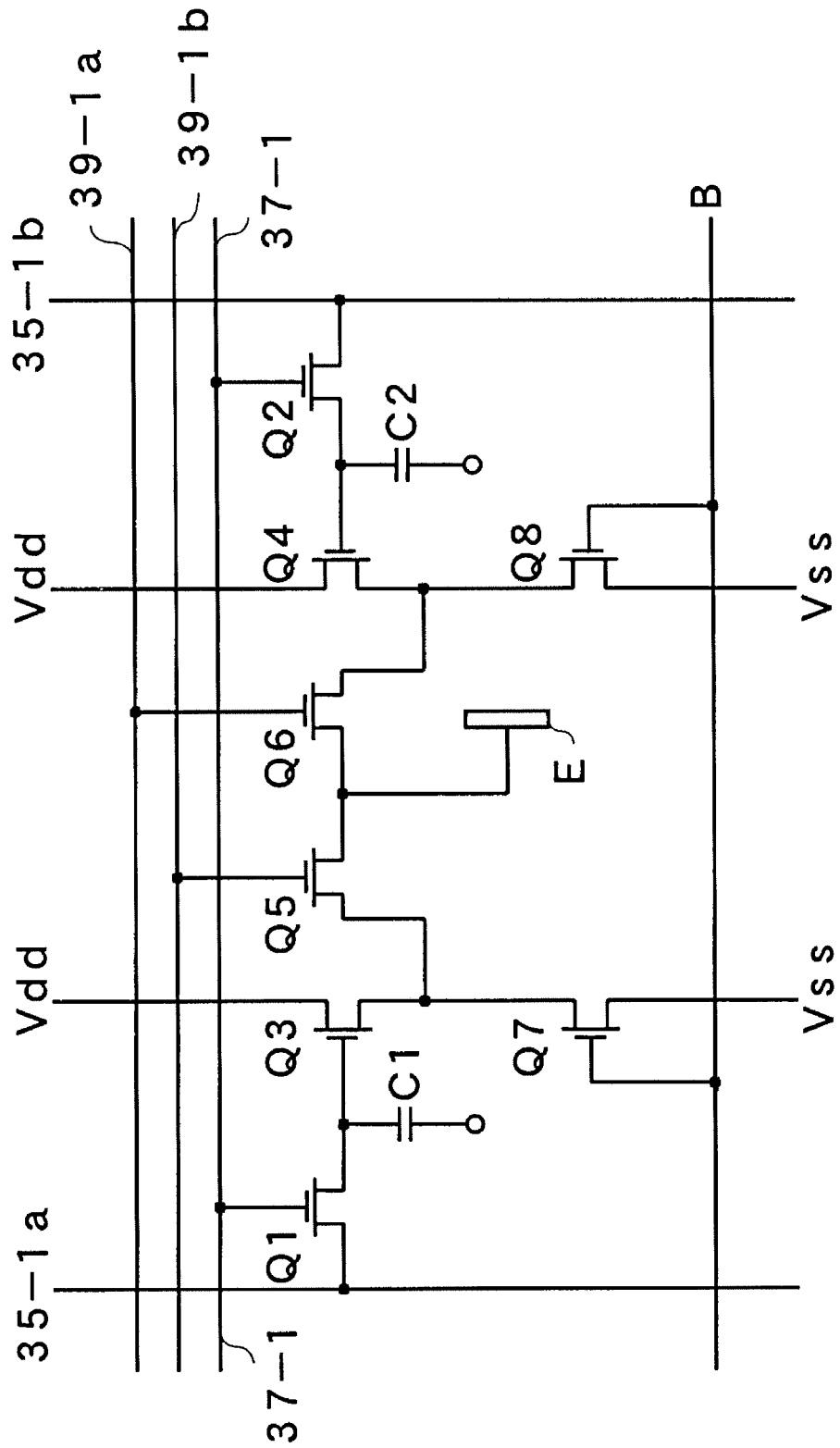
FIG. 4 is a circuit diagram illustrating the detailed structure for one pixel of the LCOS element according to the embodiment.

FIG. 4 is a circuit diagram illustrating in greater detail the internal circuitry of a single pixel 31-1,1. As illustrated in FIG. 4, a single pixel of the LCOS element in the present embodiment is structured from pixel select transistors Q1 and Q2 for writing positive and negative pixel signals, to storage capacitances C1 and C2 that independently store, in parallel, pixel signal voltages of respective polarities, transistors Q3 through Q8, a reflective electrode E, and so forth. The buffer amp A1 in FIG. 2 is achieved through a constant current source load transistor Q7 wherein the value of the electric current can be controlled by the voltage that is applied to the gate, and a transistor Q3 for impedance conversion. Similarly, the buffer amp A2 in FIG. 2 is also structured through a constant current load transistor Q8 and an impedance conversion transistor Q4. The transistor Q5, which has the drain thereof attached to the source of the transistor Q3, and the transistor Q6, which has the drain thereof connected to the source of the transistor Q4, are switching transistors corresponding, respectively, to the switches S1 and S2 in FIG. 3. The constant current source load transistors Q7 and Q8 have the gates thereof connected in common to the row interconnection line B for the same pixel, structured so as to enable bias control of the constant current load.

The operation of the internal circuitry will be explained next. The horizontal direction driving circuit 32 supplies the positive-side pixel signal for the common electrode voltage of the liquid crystal through the data line 35-1a, through the horizontal signal line 34a, by the switch 36-1a. Moreover, at the same time, it supplies the negative-side pixel signal for the common electrode voltage through the data line 35-1b, through the signal line 34-b. The transistors Q1 and Q2 turn ON simultaneously through the voltage that is applied to the gates thereof through the gate line 37-1. As a result, the positive-side pixel signal that is supplied from the data line 35-1a is written to the storage capacitance C1 through the transistor Q1, and the negative-side pixel signal that is supplied from the data line 35-1b is written to the storage capacitance C2 through the transistor Q2. Following this, the transistors Q1 and Q2 are turned OFF simultaneously through the voltage applied to the gates thereof through the gate line 37-1. This causes the pixel signals for the positive side to be stored in the storage capacitance C1, and for the negative side to be stored in the storage capacitance C2.

Following this, the positive-side and negative-side pixel in signals that are stored, respectively, in the storage capacitances C1 and C2 are read in through respective buffer amps A1 and A2 that are high-input-resistance impedance converting circuits, and are alternatingly selected by switches S1 and S2 to alternatingly drive the individual pixels by changing the voltages of the reflector electrodes. Doing so enables the performance of the alternating current driving of the LCOS element at a high-speed in the present embodiment. That is, the LCOS element of the present embodiment makes it possible to prevent flickering through alternating current driving of the LCOS element at a high frequency that is, for example, several dozen times the frame frequency, independent of the writing period of the pixel signal.

FIG. 5 is a diagram illustrating the timing with which the voltages are applied to the individual pixels in the LCOS element, showing a comparison of a conventional example of the embodiment in the present application. In the case of driving the LCOS element using the driving circuit for the image display, normally voltages are applied to the individual pixels at 120 Hz alternating currents in order to display the video signal in FIG. 5 (a). However, because the time period over which the voltage is actually applied to the signal is short, the voltage level that is applied to the pixel gradually decreases with the passage of time, as shown in FIG. 5 (b). The result is a flickering phenomenon, described above.

In contrast, in the present embodiment the provision of the polarity inverting function in the pixel circuit itself and switching it at a high-speed enables alternating current driving at a high-frequency, not constrained by the vertical scan frequency. The switching frequency in the present embodiment is, for example, between 1.2 kHz and 3.6 kHz, supplying the pixel voltage at a speed that is sufficiently higher than the video frequency, as shown in FIG. 5 (c). Consequently, there is essentially no drop in the pixel voltage, making it possible to prevent the flickering phenomenon.

In the case of driving the conventional LCOS element wherein the pixel signal is supplied using a driving circuit for a screen display, and driving with an alternating current frequency of 120 Hz at an ambient temperature of 25° C., the power stability is 0.06 dB when the amount of optical attenuation is 0 dB, and 0.14 dB when the amount of optical attenuation is set to 10 dB.

In contrast, in the case of the wavelength selective switching device that uses the LCOS element according to the present embodiment, the power variation at an ambient temperature of 25° C. when the amount of optical attenuation is set to 0 dB is 0.03 dB, and when the amount of optical attenuation is set to 10 dB, there is extremely small variation of 0.04 dB. Next, at an ambient temperature of 65°, the variation in the output power is 0.03 dB when the amount of optical attenuation is set to 10 dB, which is within the acceptable range for optical communication applications. As a result, it is possible to produce a wavelength selective optical switching device with the feature of having low flickering regardless of the amount of attenuation of light. Furthermore, this makes it possible to eliminate the need for temperature control through thermoelectric elements.

Second Embodiment

A wavelength selective switching device according to a second embodiment according to the present invention will be explained next. In this embodiment as well, a wavelength selectable switching device is used as one example of an optical node device, and the overall structure is identical to that in FIG. 1. In the present embodiment, only the spatial light modulating element 17 and the driving device thereof are different. In the present embodiment as well, an LCOS element 50 is used for the spatial light modulating element 17. FIG. 6A is a diagram illustrating the LCOS element, which has a horizontal direction driving circuit 51 that operates in accordance with signals from a controller 60, a vertical direction driving circuit 52, and a group of pixels 53. This LCOS element 50 is also a high definition panel (following the HD standard), made from 1920 pixels in the x direction and 1080 pixels in the y direction, where the size of a single pixel is 8.0 μm, vertically and horizontally.

FIG. 7 is a block diagram illustrating the detailed structure of the LCOS element 50, where a portion of the pixels are omitted. In FIG. 7, the horizontal direction driving circuit 51 has a pixels H shift register 54 and a source driver 55, and the vertical direction driving circuit 52 has a V shift register 56 and a gate driver 57. Given this, a horizontal clock signal H_Clock and a horizontal start signal H_Start are inputted from the controller 60 into the H shift register 54. Moreover, the voltages that are to be applied to the individual pixels are inputted as a serial signal from the source driver 55. Furthermore, a V_Clock signal and a V_Start signal are inputted into the V shift register 56. The portion shown with diagonal lines in the pixel 53 is a pixel wherein the light beam is illuminated.

FIG. 6B is an explanatory diagram for the method of limiting the use area, using only a portion of the panel, where the portion with the diagonal lines is a region wherein the optical beam is illuminated. The region of illumination by the optical beam is from Yi=400 to Yj=536, so the width thereof is 136 pixels. Consequently, only the pixels of the area that is used need be driven, and it is not necessary to drive the other pixels. Control so as to apply the pixel voltages for only a portion of the pixels in this way is known as partial area of use. In FIG. 6A, the controller 60, during partial area use, sends the V_Clock up until Yi, and then drives at the normal speed between Yi and Yj, and then, starting at Yj, outputs a clock signal so as to fast-forward from Yj to the position Yn that is at the end of the y axis.

FIG. 8 shows the input signal into the LCOS element 50 for the partial area use method according to the present embodiment. In the case of the partial area use, the V_Start signal that is inputted into the V shift register 56 is sent faster than the normal V_Clock until the use start line Yi. Given this, after arriving at the use location, the driving is performed normally using the H_Start and H_Clock. When the use end line Yj that is the end of the use area is reached, then again there is fast-forwarding to Yn using the V_Clock. Doing so makes it possible to improve the frame rate using a single screen. In the case in the present embodiment, the actual driving frequency for the individual pixels in the use area, with the frequency for the alternating current drive if the entire area were used being 120 Hz, is equivalent to 120 Hz×(1080 pixels) divided by (136 pixels)=925 Hz. In this way, if the area of the screen used is approximately ⅛, then the frequency applied to the pixels is about 8 times, making it possible to reduce the variation in electropotential. Because of this, this is able to reduce the flickering of the screen. The result is greater the smaller the area that is used.

Similarly, in the case of partial use in the X direction, it is possible to advance in the X direction using a faster H_clock. Moreover, after applying the voltage to the Yj line, it is not necessary to send the V lines up until Yn after displaying Yj, given the provision of the reset function in the V shift register, making it possible to achieve an even faster frame rate. Similarly, the provision of the reset function in the H shift register as well makes it possible to achieve a higher frame rate. If resetting is through the V_Start and H_Start, instead of adding dedicated reset lines, the reset method can be achieved with a reduced number of signal lines.

FIG. 9 is a diagram illustrating a comparison of the timing with which voltages are applied to the individual pixels in the LCOS element, comparing the conventional example and the case of the embodiment according to the present invention. When driving the LCOS element with a driving circuit for an image display, normally the pixel voltages are applied to the individual pixels at the alternating current of 120 Hz for displaying the video signal in FIG. 9 (a). However, in this case, as illustrated in FIG. 9 (b), the voltage levels applied to the pixels gradually decline with the passage of time, as shown in FIG. 9 (b).

In contrast, in the present embodiment in the areas in the LCOS element other than those that are used are fast-forwarded, making it possible to essentially increase the drive frequency as shown in FIG. 9 (c), without being constrained by the normal verticals scan frequency. Because of this, there is essentially no decrease in the pixel voltages, as shown in FIG. 9 (b), making it possible to prevent the flickering phenomenon.

In the case of driving the LCOS element as shown above, when the amount of optical attenuation is set to 0 dB, in an ambient temperature of 25° C., the variation in the output power is less than 0.001 dB, and when the amount of optical attenuation is set to 10 dB, the variation in output power is an extremely small variation, at 0.014 dB. Next, at an ambient temperature of 65° C., when the amount of optical attenuation is set to 10 dB, the variation in the output power is 0.05 dB, which is in the acceptable range for an optical communication application. Because of this, it is possible to eliminate the need for temperature control using thermoelectric cooling elements.

Note that while in this embodiment a portion of the LCOS element screen was defined as the use area, and as long as the use area is no more than ½, the driving frequency can be increased by the inverse thereof, that is, can be increased to more than twice the original driving frequency. Consequently, although it is possible to set arbitrarily the numbers and sizes of areas used, in order to obtain the effect of reducing flickering it may be necessary to set the use area to no more than ½ or ⅓.

Although the disclosure has been described with respect to only a limited number of embodiments, those skilled in the art, having benefit of this disclosure, will appreciate that other embodiments can be devised which do not depart from the scope of the present disclosure. Accordingly, the scope of the present disclosure should be limited only by the attached claims. While in the embodiments the explanations were for frequency selective switching devices, the present invention can be applied to a variety of optical node devices that use spatial light modulating elements, for example, the present invention can be applied to a variety of devices such as wavelength blockers and wavelength equalizers.

One or more embodiments of the present invention can reduce flickering through supplying voltages to the individual pixels at a speed that is independent of and faster than the video frequency for a spatial light modulating element such as an LCOS element. Consequently, it is well suited for use in optical node devices having, for example, wavelength selective switching devices, wavelength blocker devices, and the like, that have liquid crystal spatial elements.

EXPLANATION OF CODES

1: Wavelength-Selective Optical Switching Device
1A: Electric Circuit Board
1B: Optical Module
11: Input Port
12-1 through 12-N: Output Ports
13: Beam Converting Device
14: Polarization Beam Splitter
15: Chromatic Dispersion Device
16: Optical Coupler
17: Spatial Light Modulating Element
18, 60: Controllers
20, 50: LCOS Elements
31: Pixel Group
32: Horizontal Direction Driving Circuit
33: Vertical Direction Driving Circuit
34a, 34b: Horizontal Signal Lines
35-1a, 35-1b, . . . : Data Lines
36-1a, 36-1b, . . . : Switches
37-1 through 37-N: Gate Lines
A1, A2: Buffer Amps
S1, S2: Switches

What is claimed is:

1. An optical node device comprising:
a light receiving/emitting portion comprising an input port into which a signal beam is incident and an output port that emits a signal beam of a selected wavelength;
a chromatic dispersion device that scatters spatially the signal beam depending on the wavelength of the signal beam;
an optical coupler that focuses, onto a two-dimensional plane, beams dispersed by the chromatic dispersion device;
a spatial light modulating element arranged so as to receive incident light deployed on an xy plane made up of an x-axis direction deployed according to wavelength and a y-axis direction orthogonal to the x-axis direction, and comprising a plurality of pixels arranged in a lattice on the xy plane; and
a spatial light modulating element driving portion that drives electrodes of individual pixels of the plurality of pixels arranged in the xy axial directions in the spatial light modulating element so as to either reflect or transmit each of the beams having an individual wavelength in a respective direction;
the plurality of pixels comprising:
a liquid crystal element in which a liquid crystal layer is interposed between a mutually facing pixel electrode and common electrode;
a first sampling circuit that samples a positive polarity pixel signal and holds it for a specific time period;
a second sampling circuit that samples a negative polarity pixel signal and holds it for the specific time period; and
a switching circuit that switches alternatingly a positive polarity signal voltage and a negative polarity signal voltage, stored respectively by the first and second sampling circuits, to the pixel electrode by switching, with a predetermined frequency that is higher than a vertical scanning frequency.

2. The optical node device as set forth in claim 1, wherein the plurality of pixels are provided at intersecting portions at which a plurality of sets of data lines and a plurality of gate lines respectively intersect, wherein each set of data lines has two data lines; and the spatial light modulating element further comprises:
a plurality of switches provided respectively relative to the plurality of sets of data lines, wherein the switches supply a positive polarity signal to one of the two data lines in a set and a negative polarity signal to the other data line, sequentially, by set units, to the plurality of sets of data lines;
a horizontal direction driving circuit that drives the plurality of switches, by set units, during a horizontal scanning period; and a vertical direction driving circuit that performs vertical direction driving that selects a plurality of the gate lines with each horizontal scanning period.

3. The optical node device as set forth in claim 1, wherein the plurality of pixels further comprises:
a first buffer amp that performs impedance conversion of a positive polarity signal voltage stored by the first sampling circuit; and
a second buffer amp that performs impedance conversion of a negative polarity signal voltage stored by the second sampling circuit, wherein
the switching circuit switches alternatingly, with the specific period, the positive polarity signal voltage outputted from the first buffer amp and the negative polarity signal voltage outputted from the second buffer amp.

4. The optical node device as set forth in claim 3, wherein the first and second buffer amps each comprises:
an impedance conversion transistor; and
a constant current load transistor that can control channel current characteristics with a bias voltage applied to a gate; and
the constant current load transistor becomes discontinuously active in synchronization with a timing of switching at the specific period of the switch.

5. The optical node device as set forth in claim 1, wherein the spatial light modulating element is an LCOS element having pixels arranged two-dimensionally.

6. The optical node device of claim 1, wherein the predetermined frequency is greater than or equal to 500 Hz.

7. The optical node device of claim 1, wherein the predetermined frequency is greater than or equal to 1.2 kHz and less than or equal to 3.6 kHz.

8. The optical device as set forth in claim 1, wherein when an amount of optical attenuation is set to 0 dB-10 dB, a variation in an output power of the optical device is less than 0.001 dB-0.014 dB.

9. The optical device as set forth in claim 1, wherein when an amount of optical attenuation is set to 10 dB in an ambient temperature of 65° C., a variation in an output power of the optical device is less than 0.05 dB.

10. The optical node device as set forth in claim 1, wherein the spatial light modulating element is a phase modulating spatial light modulating element.

11. An optical node device comprising:
a light receiving/emitting portion comprising an input port into which a signal beam is incident and an output port that emits a signal beam of a selected wavelength;
a chromatic dispersion device that scatters spatially the signal beam depending on the wavelength of the signal beam;
an optical coupler that focuses, onto a two-dimensional plane, beams dispersed by the chromatic dispersion device;
a spatial light modulating element arranged so as to receive incident light deployed on an xy plane made up of an x-axis direction deployed according to wavelength and a y-axis direction orthogonal to the x-axis direction, and comprising a plurality of pixels arranged in a lattice on the xy plane; and
a spatial light modulating element driving portion that drives electrodes of individual pixels of the plurality of pixels arranged in the xy axial directions in the spatial light modulating element so as to either reflect or transmit each of the beams having an individual wavelength in a respective direction, wherein
the spatial light modulating element driving portion divides the surface of use of the spatial light modulating element into at least a used part and an unused part, wherein a surface area of the used part is no more than one half of the total surface area of the spatial light modulating element; and wherein
the spatial light modulating element driving portion drives the individual pixels using a first start signal and first clock signal, wherein
the first start signal is input to the spatial light modulating element faster than the first clock signal until a use start line that defines a beginning of the used part is reached;
driving is performed within the used part using a second start signal and a second clock signal; and
when an end line is reached that defines an end of the used part, the first start signal is again inputted to the spatial light modulating element faster than the first clock signal until an end line of the unused portion is reached.

12. The optical node device as set forth in claim 11, wherein the spatial light modulating element further comprises a horizontal direction driving circuit and a vertical direction driving circuit.

13. The optical node device as set forth in claim 12, wherein the horizontal direction driving circuit further comprises an H-shift register and a horizontal source driver.

14. The optical node device as set forth in claim 13, further comprising a controller operatively connected to the H-shift register, wherein the controller inputs a horizontal clock signal H_clock and a horizontal start signal H_start to the H-shift register.

15. The optical node device as set forth in claim 14, wherein the vertical direction driving circuit further comprises a V-shift register and a vertical source driver.

16. The optical node device as set forth in claim 15, further comprising a controller operatively connected to the V-shift register, wherein the controller inputs a vertical clock signal V_clock and a vertical start signal V_start to the V-shift register.

17. The optical device as set forth in claim 16, wherein the first start signal is the V_start signal, the first clock signal is the V_clock signal, the second start signal is the H_start signal, and the second clock signal is the H_clock signal.

18. The optical device as set forth in claim 16, wherein the first start signal is the H_start signal, the first clock signal is the H_clock signal, the second start signal is the V_start signal, and the second clock signal is the V_clock signal.

19. The optical device as set forth in claim 11, wherein the surface area of the used part is no more than one third of the total surface area of the spatial light modulating element.

20. The optical device as set forth in claim 11, wherein an actual driving frequency for individual pixels of the plurality of pixels is inversely proportional to the size of the used part of the surface of use of the spatial light modulating element.

* * * * *